United States Patent
Göransson et al.

(10) Patent No.: US 11,020,878 B2
(45) Date of Patent: Jun. 1, 2021

(54) EQUIPMENT AND PROCESS FOR PRODUCING POLYMER PELLETS

(71) Applicant: Borealis Technology OY, Porvoo (FI)

(72) Inventors: Mats Göransson, Gothenburg (SE); Richard Handwerk, Schnecksville, PA (US); Sune Larsson, Svanesund (SE); Annika Smedberg, Myggenäs (SE); James Stadelman, Great Meadows, NJ (US)

(73) Assignee: Borealis Technology Oy, Porvoo (FI)

( * ) Notice: Subject to any disclaimer, the term of this patent is extended or adjusted under 35 U.S.C. 154(b) by 572 days.

(21) Appl. No.: 13/959,239

(22) Filed: Aug. 5, 2013

(65) Prior Publication Data

US 2013/0323412 A1   Dec. 5, 2013

Related U.S. Application Data (62) Division of application No. 12/733,377, filed as application No. PCT/EP2008/060356 on Aug. 6, 2008, now Pat. No. 9,212,240.

(30) Foreign Application Priority Data

Aug. 27, 2007  (EP) ..................... 07115032

(51) Int. Cl.
  B01F 3/12    (2006.01)
  B29B 7/36    (2006.01)
  (Continued)

(52) U.S. Cl.
  CPC .................. B29B 7/36 (2013.01); B01F 3/06 (2013.01); B01F 3/1242 (2013.01);
  (Continued)

(58) Field of Classification Search
  CPC .. H01B 13/147; B01F 11/0077; B01F 11/008; B01F 3/12; B01F 2003/125; B29B 2009/161; B29B 7/945; B29B 7/36
  (Continued)

(56) References Cited

U.S. PATENT DOCUMENTS 2,938,233 A    5/1960  Nack et al.
3,036,338 A *  5/1962  Nack ................... B01F 13/0227
                                                159/DIG. 3
(Continued)

FOREIGN PATENT DOCUMENTS

CN    1348858 A    5/2002
CN    1632883 A    6/2005
(Continued)

OTHER PUBLICATIONS

International Search Report and Written Opinion for International Patent Application No. PCT/EP2009/060356 Filed Jun. 8, 2008.

*Primary Examiner* — Jose I Hernandez-Kenney
(74) *Attorney, Agent, or Firm* — Warn Partners, P.C.

(57) ABSTRACT

The present invention relates to an equipment and method for producing polymer pellets which comprise one or more polymer components and one or more further components, wherein in said process at least one of said one or more further components is incorporated into pellets by applying a liquid, which comprises said at least one component, onto said pellets.

33 Claims, 1 Drawing Sheet

(51) Int. Cl.
  *B29B 7/94* (2006.01)
  *B29B 9/16* (2006.01)
  *H01B 13/14* (2006.01)
  *B01F 11/00* (2006.01)
  *B01F 3/06* (2006.01)
  *B01F 5/04* (2006.01)
  *B01F 5/06* (2006.01)
  *C08F 110/02* (2006.01)
  *B01F 5/24* (2006.01)

(52) U.S. Cl.
  CPC .......... *B01F 5/0451* (2013.01); *B01F 5/0646* (2013.01); *B01F 5/246* (2013.01); *B01F 11/008* (2013.01); *B01F 11/0077* (2013.01); *B29B 7/945* (2013.01); *B29B 9/16* (2013.01); *C08F 110/02* (2013.01); *H01B 13/148* (2013.01); *B29B 2009/161* (2013.01); *B29B 2009/163* (2013.01); *Y10T 428/2933* (2015.01); *Y10T 428/2938* (2015.01); *Y10T 428/2982* (2015.01); *Y10T 428/2991* (2015.01); *Y10T 428/2998* (2015.01)

(58) Field of Classification Search
  USPC .................................... 427/117; 118/303, 57
  See application file for complete search history.

(56) References Cited

U.S. PATENT DOCUMENTS

| | | | |
|---|---|---|---|
| 3,437,073 A | 4/1969 | Drake et al. | |
| 3,507,686 A * | 4/1970 | Hagenbach | G03G 9/1131 118/303 |
| 3,669,722 A | 6/1972 | Bishop | |
| 3,735,792 A | 5/1973 | Asizawa et al. | |
| 3,849,233 A | 11/1974 | Lykov et al. | |
| 4,110,491 A * | 8/1978 | Secor | C08C 1/14 118/602 |
| 4,212,837 A | 7/1980 | Oguchi et al. | |
| 4,221,554 A | 9/1980 | Oguchi et al. | |
| 4,241,692 A * | 12/1980 | Van Hijfte | B01F 9/0007 118/303 |
| 4,360,539 A * | 11/1982 | Sachtleben | B01J 19/123 209/576 |
| 4,483,744 A | 11/1984 | Emerson, Sr. | |
| 4,483,886 A | 11/1984 | Kowalski | |
| 4,548,767 A | 10/1985 | Hendricks | |
| 4,606,791 A | 8/1986 | Emerson, Sr. | |
| 4,801,766 A | 1/1989 | Aida et al. | |
| 4,915,987 A | 4/1990 | Nara et al. | |
| 4,954,352 A | 9/1990 | Luker | |
| 5,063,002 A | 11/1991 | Luker | |
| 5,403,528 A | 4/1995 | Fowler | |
| 5,544,426 A | 8/1996 | Yoshida et al. | |
| 5,637,350 A | 6/1997 | Ross | |
| 5,700,497 A * | 12/1997 | Stone | B07B 1/46 209/252 |
| 5,849,347 A | 12/1998 | Huber et al. | |
| 6,328,798 B1 | 12/2001 | Bostrom et al. | |
| 6,616,968 B2 | 9/2003 | Bostrom et al. | |
| 6,878,400 B2 * | 4/2005 | Colombo | B01F 5/0602 118/300 |
| 7,077,906 B2 | 7/2006 | Colombo et al. | |
| 7,112,244 B2 | 9/2006 | Takei et al. | |
| 7,637,966 B2 | 12/2009 | Bedetti | |
| 7,642,337 B2 | 1/2010 | Weyell et al. | |
| 7,810,986 B2 | 10/2010 | Landers et al. | |
| 7,966,745 B2 | 6/2011 | Bedetti | |
| 2002/0033131 A1 * | 3/2002 | Bostrom | B01F 7/022 118/303 |
| 2002/0046700 A1 | 4/2002 | Colombo et al. | |
| 2003/0020199 A1 | 1/2003 | Kajikawa et al. | |
| 2005/0118343 A1 | 6/2005 | Colombo et al. | |

FOREIGN PATENT DOCUMENTS

| | | |
|---|---|---|
| EP | 1397403 | 6/1975 |
| EP | 0 707 030 A1 | 4/1996 |
| EP | 0707030 A1 | 4/1996 |
| EP | 1695996 A1 | 8/2006 |
| FR | 1491481 A | 8/1967 |
| GB | 1 397 403 A | 6/1975 |
| JP | H08239482 A | 9/1996 |
| WO | 9308222 A1 | 4/1993 |
| WO | 9517463 A1 | 6/1995 |
| WO | 0038895 A1 | 7/2000 |
| WO | 0212354 A1 | 2/2002 |
| WO | 0212355 A1 | 2/2002 |
| WO | 2006131266 A1 | 12/2006 |
| WO | 2009027193 A1 | 3/2009 |

* cited by examiner

EQUIPMENT AND PROCESS FOR PRODUCING POLYMER PELLETS

This application is a Divisional of U.S. patent application Ser. No. 12/733,377 filed Feb. 25, 2010, which is a National Stage of International Application No. PCT/EP2008/060356, filed Aug. 6, 2008. This application claims priority to European Patent Application No. EP 07115032.0 filed on Aug. 27, 2007. The disclosures of the above applications are incorporated herein by reference.

FIELD OF THE INVENTION

The invention is directed to an equipment for producing polymer pellets, to a process for producing polymer pellets, to polymer pellets as such and to articles produced using said polymer pellets.

BACKGROUND OF THE INVENTION

The polymers are commonly in a form of pellets, granules and powder, herein referred shortly as pellets, when used for producing articles for a wide variety of end applications of polymers. Such pellets contain one or more polymer compositions and one or more further components, e.g. additives. Such further components may typically be incorporated i.a for protecting or for modifying the structure, property and/or function of 1) a pellet as such, which pellet can be an intermediate pellet product that is processed to further pellets or a final pellet for end use, or 2) a product produced using said pellets, which product can be an intermediate product which is further processed, e.g. crosslinked, to a final product or a final product, such as a cable layer or pipe.

Said further components can be incorporated into the pellet by adding component(s) to the polymer material before pelletising the composition. In some applications, see e.g. WO0038895 of Pirelli (=EP1150817) and EP1148518, one or more of said further components may be added after pellet formation by depositing the component(s) onto pre-formed pellet and allowing the component(s) to be absorbed inside the pellet matrix.

To obtain a desired effect of the added further component(s), it is important that said further component(s) is/are distributed as uniformly, i.e. homogeneously, as needed throughout a polymer pellet and also distributed uniformly between the pellets. As an example, e.g. isotropy and homogeneity are requirements in highly demanding field of electric cable manufacturing.

Thus, the method for incorporating and distributing said one or more further components within polymer pellets is very important for the performance of an article produced from said pellets.

It is thus a challenge to add, i.e. distribute, such one or more further components e.g. in a liquid medium onto the pellets. During said distribution step said further component(s) present in the liquid are typically allowed to impregnate into the pellets at a temperature below the melting point of the major polymer component of the polymer material of said pellet and then are subjected to a drying step including a further equalisation, i.e. homogenisation, step, if needed, for a predetermined time period in order to allow said further component(s) to diffuse into the pellets.

Mechanical mixing of the pellets e.g. during said distribution step can lead to the generation of polymer dust. Since the formed dust also absorbs said liquid, it may contribute to premature reactions and/or provide a non-homogeneous performance of the distributed further component(s). Thus, the dust must usually be removed in a subsequent step, for example by screening and elutriation. However, traces of dusty polymers often still remain as residues which affect the performance of the resulting article, such as an insulating layer.

As an example of said one or more further components that are incorporated to pellets by distributing the component(s) onto pellets, i.a. free radical generating agents can be mentioned. Free radical generating agents are conventionally used for modifying a polymer product via a radical reaction.

Free radical agents are used e.g. to initiate (a) a cross-linking reaction in a polymer, i.a. primarily a formation of interpolymer crosslinks (bridges) by radical reaction, (b) a grafting reaction in a polymer, i.e. introduction of compounds to a polymer chain (to backbone and/or side chains) by radical reaction, and (c) a visbreaking reaction in a polymer, i.e. modification of melt flow rate (MFR) of a polymer by radical reaction. These polymer modifications are well known in the art.

When added to a polymer composition, free radical generating agents act by generating radicals, typically by decomposing to radicals, under conditions which enable the radical formation.

Crosslinking of polymers, e.g. polyolefins, substantially contributes to an improved heat and deformation resistance, creep properties, mechanical strength, chemical resistance and abrasion resistance of a polymer. Crosslinked polymers, such as crosslinked ethylene homo- and/or copolymers, are commonly used as a layer material in wire and cable applications, such as insulating layer material, semi-conducting layer material and/or jacketing layer material. The crosslinked polymers are also widely used in other end applications of polymers such as in pipe applications.

In wire and cable applications a typical cable comprises at least one conductor surrounded by one or more layers of polymeric materials. In power cables including medium voltage (MV), high voltage (HV) and extra high voltage (EHV) said conductor is surrounded by several layers including an inner semiconductive layer, an insulation layer and an outer semiconductive layer, in that order. The cables are commonly produced by extruding the layers on a conductor. One or more of said layers are then typically cross-linked for the above reasons.

Peroxides are commonly used free radical generating agents used i.a. in the polymer industry for said polymer modifications.

It is also known to crosslink polyolefins, such as polyethylene, by introducing crosslinkable groups, such as hydrolysable silane groups, into the polymer by copolymerisation or grafting. The crosslinking of polymers with hydrolysable silane groups is carried out by so-called moisture crosslinking (water crosslinking) in the presence of e.g. a so-called silanol condensation catalyst, for instance carboxylates of metals, such as tin, zinc, iron, lead and cobalt; organic bases; inorganic acids; and organic acids.

Further components such as additives may naturally also be added onto pellets after pellet formation, such as antioxidants, light stabilizers, UV stabilizers, crosslinking boosters, scorch retardants, etc., as evident for a skilled person.

For example, it is important that a high voltage cable including crosslinked HV cable, comprises an isotropic and homogeneous insulating layer to obtain the high value of dielectric strength required for its operation.

The above mentioned WO 0038895 describes a method for introducing a liquid substance into polymer granules comprising spraying the substance onto continuously flowing granules in a static spraying chamber, passing the granules through a mixing chamber comprising static mixing means without moving mechanical elements to submit mixing thereof, and thereafter drying the granules in a drying chamber.

The granules flow in a substantially continuous manner by gravity through said spraying, mixing and drying chambers arranged in substantial vertical alignment. The spraying chamber may comprise a plurality of vertically arranged ducts. The static mixing chamber is designed to deviate the granules flowing in the central part of the mixing chamber towards the peripheral zone thereof, and the granules flowing in the peripheral zone towards the central zone thereof.

Known within the art is also the so-called continuous zig-zag blender, for instance supplied by Patterson Kelly, wherein a liquid substance is sprayed onto continuously flowing pellets. The zig-zag blender comprises an entrance part in the form of a drum section and thereafter a plurality of bends arranged in an essentially horizontal spiral manner. The whole equipment rotates 360° around its axis which results in movement of the pellets and thus mixing. The zig-zag blender is not self-cleaning. Moreover, the zig-zag blender comprises seals which are clear contamination sources since a seal in a rotating equipment is exposed to a continuous wear and therefore will be mechanically damaged with time and thus have limited use life.

OBJECTS OF THE INVENTION

Thus, one object of the present invention is to provide a simplified process and an equipment for introducing one or more further components, preferably in a liquid medium, onto polymer pellets for providing a homogeneous distribution of said further component(s) among the pellets while protecting the physical integrity of the pellets.

Preferably said equipment and process of the invention also enables to decrease markedly or even prevent the formation of dust due to mechanical abrasion.

Furthermore, the process and equipment of the invention preferably allow a high distribution efficiency in terms of fast distribution of said one or more further components onto pellets and between the pellets. Preferably, at the same time advantageously even distribution of said one or more components inside a pellet and/or between the pellets is achieved with the process and equipment of the invention.

The expression "distribution onto and between the pellets" is equally referred herein as "distribution among(st) the pellets".

Moreover, due to present invention high production rates of polymer pellets with very feasible distribution efficiency of said one or more further components by using a reduced size of equipment may be obtained, if desired. The reduced size of the equipment of the invention provides an industrially desirable solution. Moreover, said equipment of invention, preferably with reduced size compared to prior art solutions for said pellet production, preferably has advantageous self-cleaning properties.

DESCRIPTION OF THE INVENTION

The present invention is based on the finding that these objectives can be achieved by a method and an equipment which comprises a first mixing section (A) in which polymer pellets, onto which one or more further component(s) are applied, are caused to flow through vibration, oscillation and/or fluidisation.

Equipment

Figure 1:
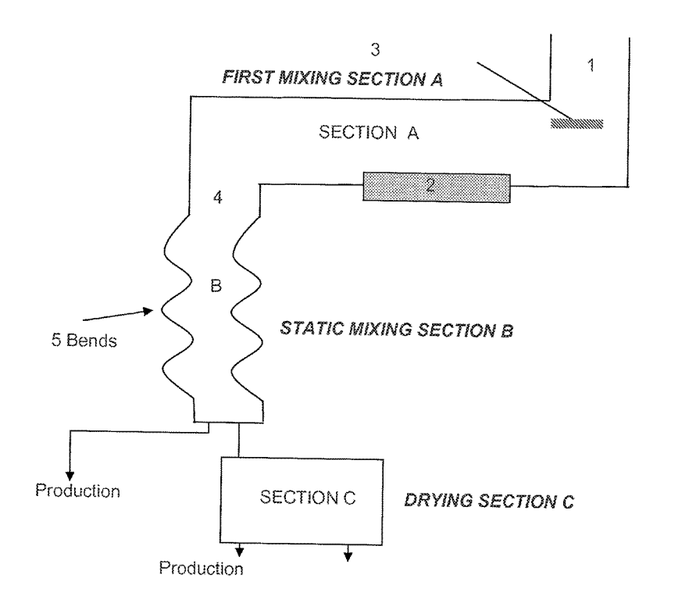
FIG. 1 is a flow chart of an equipment and method of the invention.

According to a first aspect, the present invention provides an equipment for producing polymer pellets comprising one or more polymer components and one or more further components, which equipment comprises at least one first mixing apparatus (A) for introducing at least one of said one or more further components that are to be incorporated to said pellets, onto polymer pellets, wherein said first mixing apparatus (A) comprises:

an inlet (1) for feeding polymer pellets into said first mixing apparatus (A),
a first mixing section (A) provided with mixing means (2) for moving and mixing said fed pellet stream along said section (A),
at least one means (3) for applying said further component(s) onto the fed polymer pellets at one or more positions selected from prior to said apparatus (A), at said inlet (1) of said apparatus (A) and/or within said section (A) of said apparatus (A), and
an outlet (4) for removing the mixed pellet stream from said first mixing section (A), wherein said means (2) for moving and mixing said pellet stream in said section (A) is selected from one or more of a vibration means (2a), oscillation means (2b) or fluidisation means (2c).

Preferably said at least one of said one or more further components are introduced in a liquid medium, which is herein shortly referred as "liquid", onto the pellets.

Thus a preferable equipment of the invention for producing pellets comprising one or more polymer components and one or more further components comprises at least one first mixing apparatus (A) for introducing a liquid onto polymer pellets, wherein said liquid comprises at least one of said further component(s) that are to be incorporated into said pellets, said first mixing apparatus (A) comprises:

an inlet (1) for feeding pellets into said first mixing apparatus (A),
a first mixing section (A) provided with mixing means (2) for moving and mixing said fed pellet stream along said section (A),
at least one means (3) for applying said liquid onto said polymer pellets, prior to said apparatus (A), at said inlet (1) of said apparatus (A) and/or within said section (A) of said apparatus (A), and
an outlet (4) for removing the mixed pellet stream from said first mixing section (A)

characterised in that said means (2) for moving and mixing said pellet stream in said section (A) is selected from one or more of a vibration means (2a), oscillation means (2b) or fluidisation means (2c).

The present invention is described below by referring to preferable "liquid" as the medium for introducing said further component(s). However, the invention is not limited to a liquid medium, but, alternatively, it covers also embodiments wherein said further component(s) can be introduced in solid powder form onto the pellets.

The apparatus (A) of the invention is found to be surprisingly effective for depositing the liquid homogenously onto and between the pellets. The term "depositing" means herein applying and distributing of liquid onto and between the pellets.

The first mixing section (A) of the invention is for transferring said pellet stream towards the outlet (4) of said section (A) and simultaneously for mixing the pellets in order to distribute and adsorb said one or more further components present in said liquid onto a pellet, between the pellets and inside a pellet. "Mixing" thus includes herein distributing the liquid and the components thereof onto, between and inside the pellets.

As well known, "adsorption", "absorption", "distribution inside a pellet", "impregnation" etc are used herein interchangeably and mean the diffusion of the further component(s) from the surface of the pellet inside the pellet matrix. The term "Homogenisation" and "equalisation" include herein the above diffusion in order to improve or complete the distribution between and within the pellets.

The first mixing apparatus (A), mixing apparatus (A) and apparatus (A) mean the same and are used herein interchangeably. The equipment of the invention may comprise more than one of said first mixing apparatus (A), preferably one. The first mixing section (A), mixing section (A) and section (A) mean the same and are used herein interchangeably. The mixing apparatus (A) may comprise more than one first mixing sections (A), preferably one, which section (A) is integrated with said inlet (1), said one or more means (3) for applying at least one of the one or more further components, outlet (4) and mixing means (2). The mixing section (A) may comprise one or more inlet(s) (1) and outlet(s) (4), in any position of section (A), for feeding and, respectively, removing of pellets of the pellet stream.

The preferred first mixing section (A) of the first mixing apparatus (A) of the invention has an elongated structure comprising the inlet (1) at one of the two end parts thereof and the outlet (4) at the other end part thereof.

It is also preferred that the elongated first mixing section (A) is arranged horizontally or essentially horizontally. More specifically the elongated first mixing section (A) is arranged horizontally, whereby its longitudinal axis between inlet (1) and outlet (4) is along the horizontal line (about 0°), or essentially horizontally, wherein the elongated first mixing section (A) is declined so that the outlet (4) end deviates less than 90°, preferably less than 45°, above or below from said horizontal line. Accordingly, "horizontally" and "essentially horizontally" means herein that said longitudinal axis of the elongated first mixing section (A) at said inlet (1) is defined to be in the horizontal line (0°), and the longitudinal axis at said outlet (4) end may be in the position (declined) of 0 to 90° above or below from said horizontal line, preferably of from 0 to 45°, more preferably of up to 20°, more preferably of up to 15°, even more preferably of up to 10°, above or below the horizontal line. In this preferred arrangement said pellet stream proceeds essentially horizontally along the longitudinal axis in said section (A) from inlet (1) towards the outlet (4). The individual pellets of within the moving pellet stream can move at the same time in any directions.

It is furthermore preferred that said means (2) for moving and mixing said pellet stream in said first mixing section (A) of the mixing apparatus (A) of the invention is selected at least from one or more of a vibration means (2*a*), oscillation means (2*b*) or a combination of vibration and oscillation means (2*a*/2*b*).

It is known that vibration can be achieved e.g. by high frequency and low amplitude. It is also known that oscillation means a rotary movement. It is clear that the vibration and oscillation is produced by an external source other than fluidisation with gas or liquid medium. Fluidisation of the pellet stream can be achieved by gas and/or liquid medium, e.g. as in fluidised bed, but preferably the velocity of the liquid and/or gas flow is less than the velocity of a conventional fluidised bed mixer. It is evident that at least the vibrating and/or oscillating movement of the pellet stream causes the individual pellets to move in any directions within the moving stream.

The preferred first mixing section (A) of the mixing apparatus (A) of the invention comprises at least vibration means (2*a*) and/or oscillation means (2*b*) and is thus other than a fluidised bed mixing system.

In the apparatus (A) according to the invention the pellets are thus caused to flow through the first mixing section (A) by vibration, oscillation or fluidisation, or in any combination thereof. Thus the mixing means (2) of the invention may comprise means which provide e.g. a combination of vibrating and oscillating function. Preferably, said means (2) is a device which causes the pellet stream to vibrate and oscillate at the same time.

In the apparatus (A) of the invention, when in operation, the pellet stream flows at least non-gravimetrically due to mixing means (2) of the invention. This offers the advantage that the number of contacts between the pellets, in particular the surface of the pellets, is increased and hence a more even and efficient distribution between pellets and within pellets of the applied liquid is obtained compared to an apparatus in which pellets are caused to flow by gravity or by a rotational movement.

As used herein the term "non-gravimetrical flow" means that another force than gravity is required in order to cause the pellets to flow. In addition to said non-gravimetrical flow provided by the apparatus (A) of the invention, it is naturally possible to arrange the pellet stream to flow in said apparatus (A) also gravimetrically for assisting the transfer and/or mixing of the pellet stream.

Furthermore, the dimensions of the section (A) of said apparatus (A) can be made rather small, e.g. smaller than for an apparatus with gravimetrical flow. The small size of the apparatus (A), in turn, also contributes to an enhanced contact between the pellets and thereby a more efficient and more even distribution of the liquid.

Still further, no mechanical mixing means including static mixing means, such as baffles, or mechanically moving mixing means are necessary inside the apparatus (A). Moreover, the apparatus (A) according to the invention is more or less self-cleaning, for instance, due to the continuous flow of pellets within the apparatus. Alternatively, in addition to said mixing means (2) of the invention, if desired, the apparatus can comprise additionally also static and/or moving mixing means inside the first mixing section (A).

The term "pellet stream" comprises said fed pellets and said liquid applied to pellets. Furthermore, at least in case said means (2) is a fluidisation means (2*c*), then the pellet stream comprises additionally also a fluidisation medium for carrying said pellets and liquid.

As used herein the term "polymer pellets" or shortly "pellets" means any solid form of polymer material and includes well known pellets, granules and small particles, such as polymer powder, of polymeric material. "Pellet material" as used herein naturally means said one or more polymer components and further components that are present in a pellet of said fed pellets. "Polymer material of pellets" means said one or more polymer component(s) that are present in a pellet of said fed pellets. It is evident, that said fed pellets may be the same, i.e. each pellet comprise the same polymer component(s) and same further component(s), or the fed pellets may be a mixture of two or more type of pellets, whereby said two or more type of pellets have differing polymer component(s) and/or further component(s).

The term "liquid" means a liquid medium which is to be applied, deposited and distributed onto and between the pellets and comprises, one or more further components, which are to be incorporated to the pellets, optionally in a liquid carrier medium. Such components are not limited and can be any components suitable for incorporating to polymer pellets depending on the end use application of the pellets. As non-limiting examples additives, which term includes herein fillers, that are useful in polymer applications can be mentioned. Said components may either be in liquid form as such, so that they can be directly used in that form. Alternatively, said components may be solids which are brought to liquid form by dissolution, dispersion, emulgation, suspension or melting etc. The liquid in which solid further components are contained may itself be one of said further components or, alternatively, an inert solvent.

In one embodiment of the invention said equipment further comprises at least one static mixing section (B) arranged to follow the outlet (4) of the first mixing section (A), allowing for further mixing of the pellets. Preferably, said section (B) comprises a plurality of essentially vertically positioned bends (5), for subjecting the pellets to flow continuously, suitably by gravity, and to mix.

In another embodiment of the invention said equipment further comprises at least one drying section (C) arranged to follow said first mixing section (A), or to follow said optional static mixing section (B), if present, for allowing further absorption of said one or more further components present in said liquid into the pellets.

Drying (C) section comprises one or more drying tanks providing sufficient residence time for the component from said liquid to be further absorbed from the surface to the inside of said pellets.

The first mixing apparatus (A) of the invention can thus be combined, if desired, with one or both of said static mixing section (B) and said drying section (C). In one preferable embodiment of the invention said equipment comprises said first mixing apparatus (A), said static mixing section (B) and said drying section (C), in that order.

It is evident for a skilled person that said equipment of the invention may naturally comprise supporting means adapted to support said means for applying the liquid onto the pellets, said first mixing section (A), and, optionally, said static mixing section (B), and, optionally, said drying section (C).

In one preferable embodiment of the equipment of the invention at least one of said first mixing section (A), optional static mixing section (B) and optional drying section (C) are avoid of any mechanical mixing means, which are static and/or mechanically moving, such as baffles, inside the said section. Preferably in such embodiment said section (A), section (B), if present, and section (C), if present, does not contain any mechanical mixing means, more preferably, any static or mechanically moving mixing means, inside the section.

The equipment of the invention may be operated in a batch process or, preferably, in a continuous process for producing polymer pellets by incorporating said one or more further components into pellets. Preferably said equipment is adapted to operate in a continuous process.

The term "continuous process" is a well known and widely used term and means that the process is operated in a continuous, essentially uninterrupted basis in a manner well known to a skilled person.

Moreover, the equipment of the invention can be used in a separately operating production process of said polymer pellets which produced pellets are then supplied to end users, e.g. end producers of articles prepared using said polymer pellets of the invention.

Alternatively, said equipment can be arranged in a production line of an end product which end product is produced using said polymer pellets obtainable from the equipment of the invention. In this arrangement said equipment naturally precedes the end article forming unit.

Process of the Invention

According to a second aspect, the invention provides a process for producing polymer pellets which comprise one or more polymer components and said one or more further components, wherein in said process at least one of said further component(s) is incorporated into pellets by applying said at least one of said further component(s) onto polymer pellets, and wherein said process comprises the steps of:

feeding the polymer pellets in a first mixing section (A), which is preferably as defined above or below, and arranged to cause the fed polymer pellets to flow and mix through one or more of the following movements selected from vibration, oscillation or fluidisation, applying at least one of said further component(s) via at least one application means (3), preferably as defined above or below, at one or more positions selected from onto the fed polymer pellets prior to apparatus (A), at said inlet (1) of said apparatus (A), which is preferably as defined above or below, and/or within said first mixing section (A) of said apparatus (A), which is preferably as defined above or below, and recovering the obtained pellets in a conventional manner as well known for a skilled person.

Preferably said at least one of said one or more further components that are to be incorporated to pellets of the invention are applied in a liquid as defined above or below.

Thus in a preferable embodiment, a process for producing polymer pellets, which comprise one or more polymer components and one or more further components, is provided, wherein in said process at least one of said further component(s) is incorporated into pellets by applying a liquid, which comprises said at least one of said further component(s), onto said pellets and wherein said process comprises the steps of:

feeding polymer pellets in a first mixing section (A), which is preferably as defined above or below, and arranged to cause the fed polymer pellets to flow and mix through one or more of the following movements selected from vibration, oscillation or fluidisation, applying said liquid via at least one application means (3), which are preferably as defined above or below, onto the fed polymer pellets at one or more positions selected from prior to said apparatus (A), at said inlet (1) of said apparatus (A), which is preferably as defined above or below, and/or within said first mixing section (A), which is preferably as defined above or below, and optionally subjecting the pellet stream leaving said first mixing section (A) to a further mixing in a static mixing section (B), which is preferably as defined above or below, and/or optionally subjecting said polymer pellets obtained from said first mixing section (A), or from said optional static mixing section (B), if present, to a further drying in a drying section (C), which is preferably as defined above or below, for a time period, and recovering the obtained pellets in a conventional manner.

The recovery step is e.g. any conventional recovery of the pellets for temporary storage and/or further use, as known for a skilled person.

In said process at least one of said further components are thus incorporated to said pellets by applying a liquid comprising said at least one further component(s) onto said pellets in order to allow said incorporation to occur. The term "incorporating" means herein that the further component(s) are deposited and distributed onto and between pellets and then absorbed inside the pellets, i.e. within the pellet matrix.

It is also preferred that said fed pellet stream flows and the pellets mix at least by vibrating and/or oscillating movement along the longitudinal axis of the first mixing section from inlet (1) towards an outlet (2) arranged at the other end in the direction of the longitudinal axis of the mixing section (A).

Moreover, in the preferred process said pellet stream moves horizontally or essentially horizontally along an elongated first mixing section (A) from inlet (1) arranged at one end of said elongated mixing section (A) towards the outlet (4) arranged at the other end of said elongated mixing section (A), preferably said pellet stream moves horizontally or essentially horizontally along said longitudinal axis from said inlet (1) end of said first mixing section (A), which is defined to be in said horizontal line (0°), towards said outlet (4) end of said mixing section (A), which is positioned 0 to 90° above or below from said horizontal line, preferably between 0 to 45°, more preferably up to 20°, suitably of up to 15°, preferably of up to 10°, above or below the horizontal line.

In said process of the invention said vibration, oscillation and/or fluidisation causes the one or more further components present in the liquid to distribute evenly among the pellets and within a shorter time period compared to prior art due to increased contacts between the pellets in said pellet stream.

In a preferred embodiment of the process of the invention the polymer pellets leaving the first mixing section (A) are passed to a static mixing section (B), which preferably comprises a plurality of essentially vertically positioned bends (5), wherein the pellet stream flows, preferably continuously by gravity, for further mixing said pellets and liquid in said pellets stream.

Furthermore, preferably the method comprises the step of passing the mixed pellets through at least one drying section (C) for allowing further absorption of the said further component(s) present in said liquid into the pellets. In a preferable embodiment of said drying section (C) the pellet stream flows preferably by gravity through the drying section (C).

Moreover, the pellet stream can be heated prior to and/or during the drying step (C).

The process of the invention is preferably carried out using the equipment of the invention. The preferred equipment for carrying out the process for producing pellets of the invention is thus the equipment for producing pellets as defined above, below and in claims.

Preferably the process of the invention operates in a continuous basis, i.e. is a continuous process. The meaning of continuous process is well known in the art. Alternatively, a batch-process is also covered. Moreover, the process can be operated as a separate polymer pellet manufacturing process or it can be operated in a production line of an intermediate and/or end product that is produced using polymer pellets obtainable by the process of the invention.

The temperature during the first mixing step (A), during said optional static mixing section (B), if present, and during said optional drying section (C), if present, is not critical and may vary and is typically above the solidification point of said liquid and/or said added further component(s).

Further preferably, the operating temperature in each of said section (A) and optional sections (B) and (C), may be selected to be such that temperature of the polymer material of said fed pellets is kept below the melting point of the major polymer component of said fed pellet material, preferably at or above ambient temperature. More preferably, the temperature of said fed polymer pellets in said section (A) and, if present, in said optional section (B) and/or optional section (C) is kept at least 10° C., more preferably at least 15° C., more preferably at least 20° C., below the melting point of the major polymer component of the polymer material of said fed pellets, as evident for a skilled person.

Residence time in each of said first mixing section (A), optional static mixing section (B), if present, and drying section (C), if present, can be varied depending on the desired degree of distribution among and within the pellets. The desired degree of distribution may vary i.a. depending on the one or more further components, pellet material and the end use application of the pellets, as well known to a skilled person.

DETAILED DESCRIPTION OF THE INVENTION

The features, preferable embodiments and variants of the equipment and process of the invention are further described below. It is understood that said features, embodiments and variants can be combined in any combination and in any order.

Preferably, the first mixing section (A) of the apparatus (A) of the invention an elongated structure with closed side walls.

This structure of section (A) can have any suitable cross-sectional shape, including round, e.g. circular, cross-sectional shape and multiangular cross-sectional shape, e.g. a rectangle or square. Alternatively, said structure may have a U- or V-shape cross-section, in case open systems of section (A) are desired.

Preferably, the first mixing section (A) of the apparatus (A) of the invention comprises, preferably consists of, a closed-wall, elongated structure, such as a tubular structure, preferably a pipe, which is connected at one end in the longitudinal direction of said section (A) to said inlet (1) of said apparatus (A) and connected at the other end of said section (A) to said outlet (4) of said apparatus (A) for receiving the fed pellets and removing the mixed pellets; one or more application means (3) for applying said liquid on the pellets; and mixing means (2) for mixing and transferring the pellet stream.

Preferably, said section (A) is a pipe with a circular or a rectangular or a quadratic cross-section shape. Alternatively, the first mixing section (A) can be in the form of a closed tray, in particular an essentially horizontally arranged tray.

In one preferred embodiment, said first mixing section (A) has an elongated structure, preferably is a pipe as defined above, which is, in its longitudinal direction, connected at one end to said inlet (1) of said apparatus (A) and at the other end to said outlet (4) of said apparatus (A). Preferably said longitudinal axis of said section (A), such as pipe as defined above, is along horizontal line, which is also known as central line, which is defined to be 0°, or said longitudinal axis of said first mixing section (A) may be declined 0° to 90° above or below from said horizontal line. Preferably, when said longitudinal axis at said inlet (1) end of said first mixing section (A) is defined to be fixed in said horizontal line (0°), then said longitudinal axis at said outlet (4) end of said section (A) may be inclined 0 to 90° above or below from said horizontal line, such as up to 20°, suitably of up to 15°, preferably of up to 10°, above or below the horizontal line from the horizontal line.

Preferably, when said longitudinal axis at said inlet (1) end of said first mixing section (A) is defined to be fixed in said horizontal line (0°), then said longitudinal axis at said outlet (4) end of said section (A) may be inclined 0 to 3° above or below from said horizontal line Preferably, the first mixing section (A) itself does not rotate 360° around its axis that is parallel to the flow direction of the pellet stream. If means (2a) and (2b) are used, then vibration and oscillation of the pellet stream is caused by means (2) which is preferable arranged outside section (A) in operational contact therewith in a manner known to a skilled person. Thus in case of means (2a) or (2b), the mixing section (A) can be moved by means (2a) and/or (2b). However such movement of section (A) preferably excludes the rotation of section (A) of full 360° around the axis that is parallel to the flow direction of pellet stream. Alternatively, e.g. when pellets possess sufficient wear resistance, then the section (A) of the invention may also be arranged to rotate 360° around its axis that is parallel to the flow direction of the pellet stream, in addition to movement caused by means (2).

The total time period required for the first mixing step (A) in the first mixing apparatus (A) of the invention may vary and can be e.g. less than 10 minutes, such as less than 7 minutes, preferably less than 5 minutes, more preferably less than 4 minutes. In one further preferable embodiment of the invention, the mean residence time of a pellet in section (A) is very short, less than 3 minutes, preferably less than 2, more preferably less than 1 minute, such as between 5 and 45 sec. Depending on the embodiment, as short mean residence time of a pellet as within the range of 5-30 sec, may also be sufficient.

The equipment of the invention may comprise one or more of said apparatus (A), or said apparatus (A) of the invention may comprise one or more first mixing sections (A), which apparatuses (A) and/or sections (A) are arranged in series and/or in parallel.

The inner surfaces of the first mixing section (A) are advantageously polished, for example polished and/or even electro-polished, in order to reduce abrasion of the pellets.

As to the mixing means (2) of the apparatus (A) of invention, said vibration means (2a) and oscillation means (2b) of the first mixing section (A) can be any means that causes the pellet stream to vibrate and, respectively, oscillate in order to transfer and mix the polymer pellet stream for distributing said liquid among the pellets. Said means (2a) and (2b) may be provided in one operating system that both vibrates and oscillates. Preferably, said means (2) is a device arrangement which causes the pellet stream vibrate and oscillate. Suitable means for vibration/oscillation are well known and can be e.g. any commercially available mechanical and/or electromechanical means that can be arranged to the first mixing section (A). Preferably such means are arranged outside, externally, said section (A) to cause the section (A) to at least vibrate, and, optionally also oscillate, and thereby to cause the pellet stream to vibrate and optionally oscillate within said section (A). Preferably, in this embodiment no mechanical mixing means, moving or static, are present in said first mixing section (A).

The degree of vibration/oscillation is controlled by controlling the frequency, amplitude and direction of vibration/ oscillation and can easily be adjusted to suitable values by a man skilled in the art. The appropriate degree of vibration/ oscillation may vary between different embodiments of the invention depending on, for instance, the capacity (volume) of the first mixing section (A), the flow of polymer pellets, the type of polymer, the flow of the liquid, the type of the further component(s) present in the liquid etc.

As to fluidisation means (2c) of the apparatus (A) of the invention, fluidisation of the pellet stream in the first mixing section (A) of the invention is effected by fluidisation means (2c) of the polymer pellets for moving/mixing the pellets stream in a fluidization medium, selected from a gas, such as air or $N_2$, or a liquid medium. Fluidization means (2c) can be operated in a pneumatic or hydraulic manner, depending on the used fluidization medium, in order to suspend, transfer and mix said fed polymer pellets and applied liquid along said section (A) and towards the outlet (4) as well known in the art. Preferably said fluidisation medium is inert.

In a further embodiment of the invention, the first mixing section (A) is caused to vibrate and/or oscillate by application of mechanical and/or electromechanical means (2a) and/or (2b) and additionally the polymer pellets and applied liquid(s) are caused to fluidise by suspending them in a moving liquid or gas, such as air. The introduction of gas and/or liquid may be operated e.g. by hydraulic means (2c), respectively, by pneumatic means (2c).

As to at least one application means (3) of the apparatus (A) of the invention, such means (3) for applying, i.e. adding, said further component(s), e.g. as said liquid, onto the polymer pellets can be arranged prior to said first mixing apparatus (A), at the inlet (1) of said apparatus (A) or within the first mixing section (A) of said apparatus (A). In case the apparatus (A) comprises two or more of said means (3), these can be arranged in different positions within said apparatus (A). Preferably at least one application means (3) of the invention is arranged within said inlet (1) of the apparatus (A) and/or within said first mixing section (A). Also preferably when said one or more means are within said section (A), then preferably at least one of said means (3) is positioned very close to said inlet (1).

In case fluidisation means (2c) are used alone or in any combination with means (2a) and/or (2b) the direction of the pellet stream is essentially horizontal as defined above and again the individual pellets in the horizontal pellet stream transfer can move in any direction.

It is thus possible to arrange one or more application points along the first mixing section (A) for adding said further component(s) at different positions of said section (A). Moreover, in case two or more further components are added via application means (3) of the invention, then these may be added together or one or more of said components may be added separately or as a mixture. Such separate application(s) may occur, as evident, from different or same application means (3), from different positions within the apparatus (A) or at different time points during the first mixing step (A), or in any combinations thereof.

Furthermore, at least one of said application means (3), when present in first mixing section (A) and/or inlet (1) of said apparatus (A), is preferably arranged to extend at least partly within the polymer pellet stream. I.e. said means (3) in such case is in direct contact with the polymer pellet stream, so that the addition of said further component(s) occur within said stream. In this arrangement the liquid(s) is/are applied within the continuous stream of flowing polymer pellets. In this embodiment said application means (3) may then be self-cleaning due to the stream of moving pellets around it.

Thus said means (3) for applying said further component(s) onto the polymer pellets may comprise one or more application units provided at different locations, preferably at different locations within the first mixing section (A), through which the liquid(s) is applied onto the polymer pellets.

Furthermore, the application unit(s) can be in any form, such as in T-, X- or U-form.

Each of those application units preferably comprise one or more nozzle(s). The nozzle(s) can be arranged e.g. along said T-, X- or U-form of the application unit. "Nozzle" means herein any application device comprising one or more holes, called herein injection holes, through which the liquid is applied by any means, such as by spraying, by injecting, by dripping etc, as known in the art, e.g. an injection nozzle.

Preferably, each nozzle comprises one or more injection holes, preferably a plurality of injection holes, through which the liquid is applied onto the pellets. The holes can be positioned in any direction, for example with the flow or against the flow etc. The injection holes of the nozzle can be arranged in any configuration. As examples a T-, X-, O- or U-configuration could be mentioned, wherein the injection holes can be arranged in any direction to apply the liquid e.g. against or parallel with the pellet stream flow.

The application units and thus nozzles of said application means (3) can be positioned along the first mixing apparatus (A), preferably along the first mixing section (A). Preferably said application unit part of the application means (3) are positioned within the pellet stream.

The liquid can be applied either intermittently or continuously onto the polymer pellets.

When more than one further components are to be applied through the application means these can be applied separately or as a mixture. Moreover, if more than one further components are to be applied, these can be added via the same or different application units. Accordingly, all or part of the components to be incorporated into the pellets are applied together as a mixture on to the pellets or each or part of said components are applied onto said pellets via one or more application unit(s) of said application means (3).

It shall be noted that the means (3) for applying said liquid phase preferably lacks any moving parts in order to avoid abrasion of polymer pellets.

Furthermore, the degree of filling of said pellets is high in the equipment of the invention, in particular in the first mixing section (A), preferably especially in case of continuously operated equipment. The high degree of filling ensure that minimal or no dead zones will be present and also contributes to the self-cleaning properties. The pellet stream may fill more than 20%, preferably more than 35%, more preferably 50% or more, of the volume of the first mixing section (A).

In one embodiment the feed ratio of the further component(s), preferably of said liquid, and the polymer pellets in the equipment of the invention is not limited. As an example, the weight ratio of (pellet feed):(liquid feed) can vary depending on the further components and fed pellets, and may be e.g. in the range of 99.997:0.001 to 50:50, preferably in the range of 99.5:0.5 to 70:30, more preferably between 99.0:1.0 to 85:15.

It shall be noted that the equipment, in particular the first mixing section (A), according to the invention is preferably a closed equipment with minimal leakage to the surroundings, thereby being more environmentally friendly.

As a consequence of the efficient distribution of said liquid between and within said pellets in said apparatus (A) of the invention, the need for additional mixing in static mixing section (B) can be markedly reduced or even avoided. Furthermore, the first mixing section (A) may be arranged to result in essentially homogeneous distribution and absorption of said one or more further components within the pellets that said drying step in section (C) may be shortened markedly. In some embodiments section (C) could even be avoided.

If the equipment of the invention comprises said optional static mixing section (B), a rather simple construction thereof can be used (in comparison to, for instance, the static mixer comprising deviating wings, supporting legs and baffles as described in WO 00/38895).

As used herein "static mixing section B" lacks preferably any mechanically moving mixing parts, whereby polymer dust generation due to abrasion can preferably be reduced.

The static mixing section (B) of the invention, if present, comprises means for changing the flow direction of the pellets in said continuous flow of pellets. In particular, said mixing section comprises one or more tubular bends (5), more specifically two or more bends (5) where adjacent bends (5) are connected by an intermediate part inclined downwards, for changing the flow direction of the pellets. Thus, a plurality of bends (5) are suitably arranged in a downward spiral manner causing the pellets to flow by gravity through the bends. Said structure could also be described as a zig-zag shaped structure.

Preferably, the bends (5) have a bending degree, with regard to the longitudinal axis of the mixing section (B), of at least 20°, such as within the range of 45-90°.

The distance between each bend (5) can be equal or of varying length. The angle of the bends (5) themselves should be 30-90° (60-150°). The bends (5) are placed with the needed angle to provide an easy flow of pellets.

A suitable volume of the static mixing section (B) in relation to the flow of the pellets, the type of polymer, the type of substance in liquid phase, the flow of said substance, and the volume and degree of vibration of the first mixing section (A) can be easily determined by a man skilled in the art.

It shall be noted that the static mixing section (B) of the invention can additionally comprise further mixing means typically inside said mixing device. Such further mixing means include static mechanical mixing means, such as baffles, etc, supported therein, but it is not necessary in order to obtain a sufficient degree of mixing. If present, preferably static mixing means, such as baffles, may be arranged to deviate pellets flowing in the central zone of the mixing section to the peripheral zone and vice versa. Preferably, apart from the above described bends the static mixing means (B) does not comprise further static mixing means.

The drying section (C), if present, can ensure varying degree of homogenisation of the further component(s), e.g. from a complete absorption to an essentially complete homogenisation, as desired.

Said optional drying section (C) of the equipment of the invention, if present, is preferably carried out in elevated temperature. The polymer pellet stream coming from section (A), or, if static mixing section (B) is present, from section (B), can be preheated before entering to drying section (C) and/or during the drying within section (C). The temperature during the drying step (C) may vary and is typically above the solidification point of said liquid and/or said added further component(s).

Further preferably, the operating temperature in each of said section (C) may be selected to be such that temperature of the polymer material of said fed pellets is kept below the melting point of the major polymer component of said fed pellet material, preferably at or above ambient temperature. More preferably, the temperature of said fed polymer pellets in said optional section (C) is kept at least 10° C., preferably at least 15° C., more preferably at least 20° C., below the melting point of the major polymer component of the polymer material of said fed pellets, as evident for a skilled person. Moreover, the temperature in the drying section (C) is preferably above ambient temperature, in particular above 30° C., more particularly above 40° C., and most particularly above 50° C.

The polymer pellets are advantageously flown by gravity through the drying section (C). Such flow may occur in one or more drying tanks either in parallel or in series, in a known manner.

The residence time is not limited and can vary depending on the produced pellets and the above mentioned desired degree of distribution of said further component(s). The polymer pellets may usually be kept in the drying section (C) in each drying tank e.g. for about <24 h, more preferably <20 h, still more preferably <16 h.

In embodiment where said drying section (C) of the invention is carried out in two drying tanks arranged in series, the period in the first drying tank is preferably form 0.05 to 16 h, or even less than 12 h. In turn, the time period in the second drying tank is then preferably up to 24 h, more preferably <20 h, still more preferably <16 h, and most preferably form 0.05 to 12 h, e.g. 0.1-12 h.

In case of two or more tanks of said drying section (C), the temperatures can be the same or different.

The polymer material for said pellets usable in the equipment or process of the invention is not limited and includes any polymer or polymer composition which can incorporate one or more desired further components from a liquid phase within the pellet structure.

Examples of suitable polymers for pellets usable in the equipment or process of the invention are given below only as non-limiting options. Accordingly, the polymers usable in the equipment and process of the present invention can thus be polymers of any type.

In a preferred embodiment, said polymer is a polyolefin which can be a homopolymer of an olefin or a copolymer of an olefin with one or more comonomers.

As one preferable group of said polyolefins includes homopolymer of ethylene or copolymer of ethylene with one or more comonomers, such as 1) a branched polyethylene homo- or copolymer produced in high pressure by radical polymerisation and well known as low density polyethylene (LDPE) homo or copolymer or 2) a linear polyethylene homo- or copolymer produced by low pressure polymerisation using a coordination catalyst, such as well known plastomers, linear very low density polyethylene, linear low density polyethylene (LLDPE), medium density polyethylene (MDPE) or high density polyethylene (HDPE), 3) polypropylene polymers, including homopolymers and random polymers of polypropylene and heterophasic copolymer of propylene.

Said ethylene polymers are very preferred as said polymer material of said fed pellets for the equipment and for the process of the invention, and a further preferable subgroup thereof is said 1) LDPE homopolymer or equally preferable subgroup thereof is said 1) LDPE copolymer with one or more comonomers including a) C3 or higher alpha-olefin copolymer(s), b) polar comonomers, c) silane-group containing comonomers, d) polyunsaturated comonomers, e.g. a comonomer with at least two double bonds, such as diene comonomers, or any combinations of comonomers (a)-(d). Such comonomers a)-d) are well known in the art. High pressure polymerisation for producing LDPE homopolymers and copolymers is a well known technology in the polymer field and can be effected in a tubular or in an autoclave reactor, preferably, in a tubular reactor. High pressure polymerisation is typically effected at 80 to 350° C. using a pressure of 100-400 MPa. Further details about high pressure radical polymerisation are given in WO 93/08222.

Further preferably, said 1) LDPE copolymers are the 1) LDPE copolymers of ethylene with b) a polar group containing comonomer(s) and, optionally, with other comonomer(s). As examples of comonomers having polar groups may be mentioned the following: (a) vinyl carboxylate esters, such as vinyl acetate and vinyl pivalate, (b) (meth)acrylates, such as methyl(meth)acrylate, ethyl(meth)acrylate, butyl(meth)acrylate and hydroxyethyl(meth)acrylate, (c) olefinically unsaturated carboxylic acids, such as (meth)acrylic acid, maleic acid and fumaric acid, (d) (meth)acrylic acid derivatives, such as (meth)acrylonitrile and (meth)acrylic amide, and (e) vinyl ethers, such as vinyl methyl ether and vinyl phenyl ether.

Amongst these LDPE copolymer of ethylene with one or more of vinyl esters of monocarboxylic acids having 1 to 4 carbon atoms, such as vinyl acetate, and (meth)acrylates of alcohols having 1 to 4 carbon atoms, such as methyl(meth)acrylate, ethyl(meth)acrylate and butyl(meth)acrylate are preferred. More preferably said LDPE copolymer suitable for said polymer material of said fed pellets for use in said equipment and pellet preparation process of the invention is a LDPE copolymer of ethylene with one or more of vinyl acetate, methyl acrylate, ethyl acrylate or butyl acrylate, preferably a LDPE copolymer of ethylene with methyl acrylate, a LDPE copolymer of ethylene with ethyl acrylate or a LDPE copolymer of ethylene with butyl acrylate, or any mixture thereof.

The term "(meth)acrylic acid" and "(meth)acrylate" are intended to embrace both acrylic acid and methacrylic acid and, respectively "methacrylate" and "acrylate".

The amount of said polar comonomer(s) in said LDPE copolymer is not limited and may be e.g. up to 70 wt %, preferably 0.5 to 35 wt %, more preferably 1 to 30 wt %, based on the total amount of said LDPE copolymer.

Moreover, said preferred polyolefin, preferably polyethylene, more preferably said 1) LDPE homopolymer or 1) said LDPE copolymer, which said 1) LDPE copolymer is more preferably said 1) LDPE copolymer of ethylene with b) a polar group containing comonomer(s) as defined above, may optionally further comprise unsaturation, i.e. be an unsaturated polyolefin, preferably an unsaturated polyethylene, more preferably an unsaturated 1) LDPE homopolymer or an unsaturated 1) LDPE copolymer, which said unsaturated 1) LDPE copolymer is more preferably an unsaturated 1) LDPE copolymer of ethylene with b) a polar group containing comonomer(s) as defined above, whereby said unsaturation is preferably provided by copolymerising olefin units, preferably ethylene units, with units of one or more of said d) polyunsaturated comonomer(s) and/or by using a vinyl/double bond introducing chain transfer agent, such as an alpha-olefin, such as propylene. Said unsaturated 1) LDPE homopolymer when produced copolymerising of ethylene with said d) polyunsaturated comonomer(s) is actually 1) LDPE copolymer of ethylene with said d) polyunsaturated comonomer(s), but is referred herein as unsaturated 1) LDPE homopolymer to differ it from said unsaturated 1) LDPE copolymer which further comprises other comonomers.

Such unsaturated polymers are well known and described e.g. in WO 93/08222, EP1695996 or WO2006/131266. Typically said unsaturated polyolefins have a double bond content of more than 0.1 double bonds/1000 C-atoms.

As to said preferable polyolefins, more preferably polyethylene, suitable as said polymer material for said fed pellets for said equipment and for the pellet preparation process of the present invention include a polyolefin polymer, preferably homo or copolymer of ethylene, wherein silane-groups containing compounds are incorporated by grafting using an unsaturated silane compound or by copolymerisation of said c) silane-group containing comonomer units, which grafting and copolymerisation are well known methods in the art. Copolymerising said b) silane-group containing comonomer units with olefin units, preferably with ethylene units, results naturally to a copolymer. Said silane-containing polyolefin, is preferably polyethylene, more preferably said 1) LDPE, as defined above, comprising said silane-containing compounds, which are incorporated to said polyolefin by copolymerising or by grafting, and optionally further comprising other comonomer(s), which optional further comonomer is preferably one or more of said b) polar comonomer(s) as defined above, and/or, further optionally, further comprising unsaturation provided by copolymerising said d) polyunsaturated comonomer units and/or by using a vinyl/double bond introducing chain transfer agent, as defined above.

Also 2) linear ethylene polymers prepared using said low pressure polymerisation are very suitable for the invention. As an example plastomers, VLDPE, LLDPE, MDPE and HDPE polymers can be mentioned. They can be produced in a known manner in a single or multistage processes using one or more of e.g. Ziegler-Natta catalysts, single site catalysts, including metallocenes and non-metallocenes, and Cr-catalysts. All said catalysts are very well known in the field. The multistage process includes any combinations of polymerisation processes, such as slurry polymerisation, solution polymerisation, gas phase polymerisation, or any combinations thereof, in any order.

Generally, polymers that are usable in the present invention include any known polymers, e.g. commercially available polymers, or they can prepared in a known manner according to or analogously to polymerisation process described in the literature.

Naturally any mixtures of polymers can also be used in the pellets useful for the equipment and process of the invention.

As to one or more further components usable in the liquid of the equipment or the process on the invention, said further component(s) is/are not limited and include any component suitable for providing e.g. one or more of a chemical, physical, mechanical, functional or processing property to the produced polymer pellet or to a product manufactured from the produced polymer pellets, as well known in the art.

Examples of suitable one or more further components usable in the equipment or method of the invention are given below only as non-limiting options. Herein by "selected from one or more of" is naturally understood that said liquid can comprise one or more additives within an additive group having a same function, e.g. from one or more antioxidants, and/or additives between different additive groups, such as crosslinking agents, scorch retardants and antioxidants.

Accordingly, examples of such one or more further components are e.g. those conventionally used or can be used analogically thereto in different end applications of polymers i.a. one or more of crosslinking agents, crosslinking co-agents (boosters), antioxidants, thermal stabilisers, light stabilisers, voltage stabilisers, water tree retardant agents, UV stabilisers, processing aids, lubricants, flame retardants, scorch retardants, nucleating agents, acid scavengers, inorganic fillers and organic fillers such as carbon black, and any mixtures thereof.

The amount said further component(s) depends, of course, on the component and the desired effect, and as an example e.g. each further component may be present in the pellets in amount of e.g. less than 15.0 wt %, suitably less than 10.0 wt %, preferably less than 6.0 wt %, more preferably less than 5.0 wt %, such as less than 3.5 wt % and preferably within the range of 0.005 to 3% of total weight of the polymeric pellets. However, some additives or fillers, such as flame retardants and inorganic and organic fillers may, if added to pellets, be added in higher amounts, to obtain pellets comprising such additives in an amount of up to 80 wt %, e.g. up to 50 wt % of the total weight of the polymeric pellets. Typically, such fillers which are used in higher amounts are already present in the pellets.

Said one or more further component in liquid phase is advantageously at least a crosslinking agent.

As mentioned above a crosslinking agent can be selected based on the used crosslinking technology, e.g. peroxide crosslinking technology or silane crosslinking technology. Both peroxide and silane crosslinking technologies and the crosslinking agents used in these technologies are well known and documented in the polymer literature.

As an example of crosslinking agents for peroxide crosslinking technology, in particular, the crosslinking agent contains at least one —O—O— bond or at least one —N=N— bond. Non-limiting examples of crosslinking agents are organic peroxides, such as di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, bis(tertbutylperoxyisopropyl)benzene, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis (tert butylperoxyisopropyl)benzene, 2,5-dimethyl-2,5-di (benzoylperoxy)hexane, 1,1-di(tert-butylperoxy) cyclohexane, 1,1-di(tert amylperoxy)cyclohexane, or any mixtures thereof.

Examples of crosslinking agents for silane crosslinking technology that are usable in the present invention, e.g. well known silanol condensation catalysts, i.a. those mentioned in EP736065, EP1309631 or EP1309632, can be mentioned.

Examples of crosslinking boosters usable as said one or more further components of the invention are compounds having one or more double bonds or one or more vinyl- or allyl group, such as triallylcyanurate, triallylisocyanurate, and di-, tri- or tetra-acrylates.

As antioxidants and thermal stabilisers usable as said one or more further components of the invention, i.a. phenol-based antioxidants/stabilisers, amine-based antioxidants/stabilisers, hindered amine light antioxidants/stabilizers (HALS), thioesters, phosphates, metal chelating agents, and any mixtures thereof, such as sterically hindered or semi-hindered phenols, optionally substituted with functional group(s), aromatic amines, aliphatic sterically hindered amines, organic phosphates, thio compounds, and mixtures thereof, can be mentioned.

Examples of scorch retardants usable as said one or more further components of the invention are i.a. 2,4-diphenyl-4-methyl-1-pentene, substituted or unsubstituted diphenylethylene, quinone derivatives, hydroquinone derivatives, monofunctional vinyl containing esters and ethers, or mixtures thereof.

As mentioned, said one or more further components usable in the present invention can be added as solids or can be dissolved, emulgated or suspended in a liquid medium, which can be e.g. solvent, a further one or more component which is in liquid form or a diluting agent, or any combination thereof, that, as evident for a skilled person, is suitable for forming a liquid solution or suspension with the further component(s) to be applied in said liquid onto polymer pellets using the equipment or process according to the invention. Naturally also said one or more further components can be used in a molten state.

The invention further provides polymer pellets comprising one or more polymer components and one or more further components incorporated into said pellets by applying a liquid to said pellets, wherein said pellets are produced according to the process and/or equipment of the invention.

In one embodiment, a process of the invention for producing polymer pellets for wire and cable applications is provided. Furthermore, a use of said equipment of the invention as defined above for producing polymer pellets for wire and cable applications, such as for one or more layers of a cable which comprises a conductor and one or more layers surrounding said conductor. Also polymer pellets for wire and cable applications obtainable by said process and/or equipment of the invention are provided.

In one preferable embodiment, a process of the invention for producing polymer pellets for crosslinkable articles using said equipment of the invention is provided. Said crosslinkable article is preferably a cable comprising a conductor and at least one crosslinkable layer surrounding said conductor, wherein said at least one layer is obtainable by using said polymer pellets of the invention.

The term "conductor" means herein above and below that the conductor comprises one or more wires. Moreover, the cable may comprise one or more such conductors. Preferably the conductor is an electrical conductor.

The pellets of the invention are most preferably used for power cable applications, e.g. for the known low voltage, medium voltage, high voltage or extra high voltage cable applications. In one embodiment a process of the invention for producing polymer pellets for one or more crosslinkable layers of a cable as defined above is provided, wherein said one or more crosslinkable layers are selected from one or more of an insulation layer, a semiconductive layer or a jacketing layer.

As well known for a skilled person said semiconductive layer comprises further a carbon black which is preferably already present in the pellets when fed to an first mixing apparatus (A) of the invention. In a preferable embodiment, the semiconductive layer composition may have a volume resistivity of less than 500000 $\Omega$cm, when measured at 23° C. and/or 90° C., preferably of less than 100000 $\Omega$cm, when measured at 23° C. and/or 90° C. Alternatively, when the DC volume resistivity is measured according to ISO 3915 using a crosslinked plaque, then a preferable semiconductive layer composition may have a volume resistivity of less than 5000 $\Omega$cm, preferably of less than 1000 $\Omega$cm, such as of less than 500 $\Omega$cm, more preferably of less than 100 $\Omega$cm, when measured at 23° C., or of less than 50000 $\Omega$cm, preferably of less than 10000 $\Omega$cm, such as of less than 5000 $\Omega$cm, more preferably of less than 1000 $\Omega$cm, when measured at 90° C.

In said preferable embodiment for producing crosslinkable pellets of the invention, the polymer material can be selected from e.g. any of the polymer materials exemplified above, more preferably from polyolefin, even more preferably from homopolymer or copolymer of ethylene, most preferably from said 1) LDPE homopolymer or said 1) LDPE copolymer, which 1) LDPE copolymer is preferably said 1) LDPE copolymer of ethylene with b) a polar group containing comonomer(s) as defined above, which 1) LDPE homo and copolymer are produced in high pressure by radical polymerisation, as defined above. Said preferred subgroup of polyolefin, more preferably subgroup of 1) LDPE homopolymer or said 1) LDPE copolymer, which 1) LDPE copolymer is preferably said 1) LDPE copolymer of ethylene with b) a polar group containing comonomer(s) as defined above, for producing crosslinkable pellets of the invention may optionally further comprise unsaturation, i.e. be an unsaturated polyolefin, preferably an unsaturated 1) LDPE homopolymer or an unsaturated 1) LDPE copolymer, which unsaturated 1) LDPE copolymer is preferably an unsaturated 1) LDPE copolymer of ethylene with b) a polar group containing comonomer(s) as defined above, whereby said unsaturation is preferably provided by copolymerising olefin units, preferably ethylene units, with units of one or more of said d) polyunsaturated comonomer(s) and/or by using a vinyl/double bond introducing chain transfer agent, such as an alpha-olefin, such as propylene. Said unsaturated 1) LDPE homopolymer when produced copolymerising of ethylene with said d) polyunsaturated comonomer(s) is actually 1) LDPE copolymer of ethylene with said d) polyunsaturated comonomer(s), but is referred herein as unsaturated 1) LDPE homopolymer to differ it from said unsaturated 1) LDPE copolymer which further comprises other comonomers.

In such embodiment for providing crosslinkable pellets and crosslinkable articles, said liquid to be applied onto pellets in a manner as defined above comprises one or more crosslinking agents which is/are selected e.g. from crosslinking agents as defined above, preferably at least one peroxide crosslinking agent. Preferably said liquid comprises, in addition to crosslinking agent(s), also one or more further additives including one or more crosslinking boosters, scorch retardants or antioxidants, which each can be e.g. as defined above, or, naturally, any mixtures thereof.

Furthermore, the invention provides a process for producing a cable comprising a conductor and one or more layers surrounding said conductor, wherein said one or more layers is/are selected from one or more of an inner semiconductive layer, an insulation layer, an outer semiconductive layer or a jacketing layer, if present, in that order, preferably from a crosslinkable insulation layer, a crosslinkable semiconductive layer or a crosslinkable jacketing layer, and wherein said one or more layers are obtainable by polymer pellets produced according to a process of the invention. In this embodiment said one or more of the crosslinkable insulation layer, the crosslinkable semiconductive layer or the crosslinkable jacketing layer is preferably crosslinkable by radical reaction.

A process for producing a crosslinkable cable comprising a conductor and at least one crosslinkable layer surrounding said conductor is also provided, wherein said process comprises steps of producing a crosslinkable polymer composition for said at least one crosslinkable layer using polymer pellets that are produced according to a process, as defined above or below in claims, and extruding said at least one crosslinkable layer on a conductor using the obtained polymer composition. Preferably, in this embodiment of the process of the invention said at least one crosslinkable layer is selected from layers including an inner semiconductive layer, insulation layer or outer semiconductive layer.

In a further embodiment of the process of invention said process comprises a further step of crosslinking, preferably by radical reaction, said at least one crosslinkable layer obtainable by the process, as defined above or in claims below, by subjecting said cable to a crosslinking conditions, preferably to an elevated temperature. Such crosslinking temperatures are within the skills of a skilled person.

Naturally the invention covers also a crosslinkable article, preferably a crosslinkable cable as well as a crosslinked article, preferably a crosslinked cable, which is obtainable by said process of the invention as defined above or in claims below.

The above mentioned cables, layers, crosslinkable layers and crosslinking methods are well known in the wire and cable field and well documented in the literature and thus need not to described herein in details.

The invention will now be illustrated by means of the following non-limiting examples:

EXAMPLES

For Comparative Example 1 and Examples 1 and 2 of the invention a known low density polyethylene homopolymer with a $MFR_2$ of 2 g/10 min and a density of 922 kg/m$^3$ was used. For Example 3, a polymer composition of a blend of low density polyethylene homopolymer and a known poly(ethylene-co-acrylate) was used which had a $MFR_2$ of around 3 g/10 min and a density of 926 kg/m$^3$.

The weight ratio between polyethylene and DCP in Comparative example 1 and in Example 1 and 2 of the invention were the same and in conventionally used amounts. In Example 3 of the invention similar amounts and ratios of pellets and DCP was used and additionally a further additive was added as described below. Comparable pellet/additive feeds (kg/h) were used in Examples of the invention and in Comparative example.

In Example 1, 2 and 3 of the invention the same first mixing section (A) according to the invention was used and in said Example 1 and 3 of the invention additionally a static mixer (B) according to the invention was used. In comparison of the cross sectional areas (Example 4) the same equipment as in Example 1 of the invention and in Comparative example 1 was used.

A so-called zig-zag blender was used in Comparative example 1. It was a commercially available blender and comprised a 360° cylindrical entrance section having an inner diameter which was 3 times larger than the inner diameter of section (A) in Example 3 of the invention; and 4 times larger than the inner diameter of section (A) in Example 1 and 2 of the invention; and 3 times larger than the inner diameter of section (B) in Examples 1 and 3. The total volume of the zig-zag blender of the Comparative example 1 was about 5.5 times larger than the volume of the first mixing section (A) of Example 3 of the invention and about 4 times larger volume than the total volume of first mixing section (A) and static mixing section (B) of the Example 3 of the invention. The total volume of the zig-zag blender of the Comparative example 1 was about 15 times larger than the volume of the first mixing section (A) of Example 1 and 2 of the invention and about 7 times larger volume than the total volume of first mixing section (A) and static mixing section (B) of the Example 1 of the invention.

The total mean residence time of a pellet in the equipment (A+B) of Examples 1, the equipment (A) of example 2 and the equipment (A+B) of Example 3 of the invention and in the zig-zag blender of Comparative Example 1 were comparable in that the residence time in each example was chosen to be a time period which resulted in pellets a distribution of the peroxide that is comparable with each example.

In said zig-zag blender of comparative example and in said static mixer (B) of Example 1 and Example 3 of the invention the pellets were flown through a plurality of bends.

The same temperature between 50°-80° was used in said zig-zag blender of Comparative example and in said first mixing section (A) and optional static mixing section (B) of Examples of the invention, during each compared test run.

25 pellets were taken at two time points during each test run, each time when stable conditions had been reached in the blender. The pellets were collected in pre-weighed vials with cover, one pellet in each vial. The 25 pellets from each of the two sample take-outs of a test run were taken immediately from the pellet stream coming from the outlet of the blender.

Then the vials with pellets and cover were weighed again and the weight of each pellet was calculated.

1 ml n-hexane was added to each vial. Then the pellets were extracted for 5 h at 55° C. After extraction, the solvent was analysed by HPLC and the content of dicumyl peroxide in the pellets was then calculated.

The test procedure gives an indication of the distribution of peroxide between the pellets in each test and can be used for comparing pellet samples prepared in examples of the invention and in the comparative example.

Comparative Example 1

Said polyethylene pellets and dicumyl peroxide (DCP) were added to said zig-zag blender.

The peroxide was applied by spraying through one nozzle provided with several injection holes positioned in the feeding pipe within the entrance part part.

Pellets were collected from the pellet stream coming out of the zig-zag blender and analysed as described above.

The average content of dicumyl peroxide in a pellet was found to be 1.38% by weight (standard deviation±0.16, relative standard deviation 11.4%, based on 2 tests, each including 25 test pellets).

Example 1 of the Invention

Said polyethylene pellets were fed to an essentially horizontally arranged pipe (A) of polished stainless steel having a circular cross-section The pipe (A) was caused to vibrate with a frequency of 60 Hz using a commercially available vibration generator (means (2)). This vibration caused the pellets to flow within the pipe (A).

Dicumyl peroxide (DCP) was added through a T-shaped nozzle (3) positioned within the vibratory pipe (A) close to the inlet (1) thereof.

The pellets were passed from the vibrating pipe (A) to said static mixer (B).

Pellets were collected from the pellet stream coming out of (B) and analysed as described above.

The average content of dicumyl peroxide in a pellet was found to be 1.52% by weight (standard deviation±0.25, relative standard deviation 17%, based on two tests, each including 25 test pellets).

Thus, it was shown that an equipment according to the invention can handle the same production capacity (i.e. volume of pellets) and result in a similar distribution of dicumyl peroxide between pellets even though the volume of this equipment was much smaller than the volume of the zig-zag blender used in the Comparative Example 1, as given above.

Furthermore, the mean residence time period of the pellets spent in the equipment was about 50% shorter than the corresponding time period of Comparative Example 1.

Consequently, the equipment and method according to the invention was shown to be much more efficient than the zig-zag blender of Comparative Example 1, i.e. a faster distribution of said further component in liquid phase among the pellets with the comparable level of evenness in distribution between the pellets while using an equipment with a much smaller volume.

Example 2 of the Invention

Example 2 is to exemplify an optional set up where a first mixing section (A) is used, but without a static mixer section (B). The set-up as described in Example 1 was used, i.e. T-shaped addition unit (3) (the same as described above), but no static mixing section (B).

The average content of dicumylperoxide in a pellet was found to be 1.16% by weight (standard deviation ±0.37, relative standard deviation 32%, based on two tests, each including 25 test pellets). This is a set-up that provides an industrially feasible solution with a distribution of the one or more component(s) within the pellets that would be sufficient in many end applications.

Example 3 of the Invention

A pre-blended mixture of DCP and a known crosslinking additive (CA) in a weight ratio of DCP:CA of around 5:1 was added via a X shaped nozzle (3) positioned in the inlet (1) of the first mixing section (A).

For these analyses 3 sample take-outs, each of 25 pellets were collected. This time 1 ml n-hexane was added to each vial and the extraction was done at 69° C. and for 2 h. The average content of dicumyl peroxide in a pellet was found to be 1.71% by weight (standard deviation ±0.18, relative standard deviation 10.7%, based on 25 test pellets). The results were the average values of three test series, each consisting of 25 pellets.

The average content of said (CA) in a pellet was found to be 0.38% by weight (standard deviation ±0.042, relative standard deviation 11.0%, based on three tests, each including 25 test pellets).

Example 4

Comparison of cross sectional areas of the blender of comparative example and of the equipment of the inventive examples.

The inlet part of the zig-zag blender in Comparative example 1 is compared with first mixing section (A) in Example 3. This means that the cross sectional area of the device (A) described in Example 3 has about 9 times smaller cross sectional area.

The diameter of the bend part of zig-zag blender in Comparative example 1 is compared with the static mixing section (B) in Example 3. This means that the cross sectional area of the device (B) described in Example 3 has about 9 times smaller cross sectional area and thus the throughput per cross sectional area is 9 times higher in the device described in Example 3.

We claim:

1. A process for producing polymer pellets which comprise one or more polymer components and one or more further components, wherein in said process at least one of said one or more further components is incorporated into pellets by applying said at least one further components onto said pellets, said process comprising:
providing at least one first mixing apparatus comprising,
an inlet for feeding polymer pellets into said first mixing apparatus,
a first mixing section provided with a mixing device for moving and mixing a pellet stream along said section,
at least one application device for applying said at least one further components onto fed polymer pellets at one or more positions whereby the at least one application device is arranged in the first mixing section to extend at least partly within the polymer pellet stream such that said at least one application device is in direct contact with the polymer pellet stream, and
an outlet for removing the mixed pellet stream from said first mixing section;
feeding polymer pellets in said first mixing section arranged to cause the fed polymer pellets to flow and mix through one or more of the following movements, vibration or oscillation, wherein vibration or oscillation of the pellet stream is caused by one or more of a vibration causing apparatus or oscillation causing apparatus which is arranged outside the first mixing section in operational contact therewith, and the pellet stream moves horizontally or essentially horizontally in a non-gravimetrical flow along an elongated first mixing section from an inlet arranged at one end of said elongated mixing section towards an outlet arranged at the other end of said elongated mixing section, and no moving mixing device is present inside said first mixing section, wherein a degree of filling of the polymer pellets in said first mixing section is more than 20% of the volume of said first mixing section, wherein the first mixing section itself does not rotate 360° around the axis that is parallel to the flow direction of the pellet stream;
applying said at least one further components via said at least one application device onto the polymer pellets at a position selected from one or more of prior to said apparatus, at said inlet of said apparatus and/or within said first mixing section of said apparatus and recovering the obtained pellets in a conventional manner.

2. The process according to claim 1, wherein said fed pellet stream flows and the pellets mix at least by vibrating and/or oscillating movement along a longitudinal axis of the first mixing section from the inlet towards the outlet arranged at the other end in the direction of the longitudinal axis of the mixing section.

3. The process according to claim 1, wherein said pellet stream moving horizontally or essentially horizontally along an elongated first mixing section defines a longitudinal axis and said pellet stream moves horizontally or essentially horizontally along said longitudinal axis from said inlet end of said first mixing section, which is defined to be in said horizontal line (0°), towards said outlet end of said mixing section, which is positioned 0 to 90° above or below from said horizontal line.

4. The process according to claim 1, wherein said process further comprises a step of subjecting the pellet stream leaving said first mixing section to a further mixing in a static mixing section, which is arranged to follow said outlet of said apparatus, allowing for further mixing of the pellet stream.

5. The process according to claim 1, wherein said process further comprises a step of subjecting said polymer pellets obtained from said first mixing section, or from an optional static mixing section, which is arranged to follow said outlet of said apparatus, if present, to a further drying in a drying section, which is arranged to follow said first mixing section, or said optional static mixing section, if present, for allowing further absorption homogenisation of said further components present in a liquid into the pellets, for a time period.

6. The process according to claim 1, wherein an equipment is used for producing the polymer pellets comprising the one or more polymer components and one or more further components, which equipment comprises at least one of said first mixing apparatus for introducing at least one of said further components onto polymer pellets.

7. The process according to claim 1, wherein said at least one further components are applied in a liquid medium via said at least one application device.

8. The process according to claim 1 for producing polymer pellets comprising one or more polymer and one or more further components, wherein at least one of said one or more polymer components is selected from the group consisting of a polyolefin, homopolymer of ethylene, and a homopolymer of low density polyethylene produced in high pressure by radical polymerisation.

9. The process according to claim 1 for producing polymer pellets comprising one or more polymer components and one or more further components, wherein at least one of said one or more polymer components is a copolymer of olefin with one or more comonomers selected from the group consisting of (a) another olefin that is different from said olefin, ethylene or C3 or higher alpha-olefin, (C3-C12)-alpha-olefin(s), (b) polar comonomers, (c) silane-group containing comonomers, (d) polyunsaturated comonomers, diene, and any mixture of said comonomers (a) to (d).

10. The process according to preceding claim 9, wherein said polyolefin copolymer is a copolymer of ethylene or a copolymer of low density polyethylene produced in high pressure by radical polymerisation, with one or more polar comonomers selected from the group consisting of:
  (a) vinyl carboxylate esters,
  (b) (meth)acrylates,
  (c) olefinically unsaturated carboxylic acids,
  (d) (meth)acrylic acid derivatives, and
  (e) vinyl ethers, vinyl acetate, methyl acrylate, ethyl acrylate and butyl acrylate.

11. The process according to claim 1, for producing polymer pellets comprising one or more polymer components and one or more further components, wherein at least one of said one or more polymer components is an unsaturated polyolefin, and/or an unsaturated low density polyethylene polymer of ethylene obtainable by polymerising in high pressure by radical polymerisation of ethylene units and, optionally, units of one or more polar comonomers selected from the group consisting of:
  (a) vinyl carboxylate esters,
  (b) (meth)acrylates,
  (c) olefinically unsaturated carboxylic acids,
  (d) (meth)acrylic acid derivatives, and
  (e) vinyl ethers, vinyl acetate, methyl acrylate, ethyl acrylate and butyl acrylate, wherein said polymerisation is carried out in the presence of units of one or more polyunsaturated comonomers and/or by using a vinyl/double bond introducing chain transfer agent.

12. The process according to claim 1, wherein at least one or more crosslinking agents is applied as said at least one further components onto said fed polymer pellets.

13. The process according to claim 1, wherein said process is for producing polymer pellets for wire and cable applications.

14. The process according to claim 1, wherein said process is for producing crosslinkable polymer pellets for crosslinkable articles- and/or crosslinkable polymer pellets, which comprise at least a low density polyethylene polymer, or a homopolymer of low density polyethylene produced in high pressure by radical polymerization as said at least one of said one or more polymer, components and at least one or more crosslinking agents, one or more peroxide, or one or more peroxide that is introduced to said pellets and applied as said at least one further components onto said fed polymer pellets.

15. The process according to claim 14, wherein said crosslinkable polymer pellets are produced for forming a polymer composition as a layer material for one or more crosslinkable layers of a cable, which cable comprises a conductor and at least one or more crosslinkable layers surrounding said conductor.

16. The process according to claim 14, wherein said crosslinkable polymer pellets are produced for forming a polymer composition as a layer material at least for a crosslinkable insulation layer.

17. The process according to claim 14, wherein said crosslinkable polymer pellets are produced for forming a polymer composition as a layer material for a crosslinkable semiconductive layer.

18. The process according to claim 14, wherein said crosslinkable polymer pellets are produced for forming a polymer composition as a layer material for a crosslinkable jacketing layer.

19. The process according to claim 1, wherein said process is for producing crosslinkable polymer pellets for crosslinkable articles and/or crosslinkable polymer pellets, which comprise at least one or more polymer components and one or more further components, wherein at least one of said one or more polymer components is a copolymer of olefin with one or more comonomers selected from the group consisting of (a) another olefin that is different from said olefin, ethylene or C3 or higher alpha-olefin, (C3-C12)-alpha-olefin(s), (b) polar comonomers, (c) silane-group containing comonomers, (d) polyunsaturated comonomers, diene, and any mixture of said comonomers (a) to (d).

20. The process according to claim 19, wherein said crosslinkable polymer pellets are produced for forming a polymer composition as a layer material for one or more crosslinkable layers of a cable, which cable comprises a conductor and at least one or more crosslinkable layers surrounding said conductor.

21. The process according to claim 19, wherein said crosslinkable polymer pellets are produced for forming a polymer composition as a layer material at least for a crosslinkable insulation layer.

22. The process according to claim 19, wherein said crosslinkable polymer pellets are produced for forming a polymer composition as a layer material for a crosslinkable semiconductor layer.

23. The process according to claim 19, wherein said crosslinkable polymer pellets are produced for forming a polymer composition as a layer material for a crosslinkable jacketing layer.

24. The process according to claim 1, wherein said process is for producing crosslinkable polymer pellets for crosslinkable articles and/or crosslinkable polymer pellets, which comprise at least one polyolefin copolymer which is a copolymer of ethylene, and/or a copolymer of low density polyethylene produced in high pressure by radical polymerisation, with one or more polar comonomers selected from the group consisting of:
(a) vinyl carboxylate esters,
(b) (meth)acrylates,
(c) olefinically unsaturated carboxylic acids,
(d) (meth)acrylic acid derivatives, and
(e) vinyl ethers, vinyl acetate, methyl acrylate, ethyl acrylate and butyl acrylate.

25. The process according to claim 1, wherein said process is for producing crosslinkable polymer pellets for crosslinkable articles and/or crosslinkable polymer pellets, which comprise at least one or more polymer components and one or more further components, wherein at least one of said one or more polymer components is an unsaturated polyolefin, and/or an unsaturated low density polyethylene polymer of ethylene obtainable by polymerising in high pressure by radical polymerisation of ethylene units and, optionally, units of one or more polar comonomers selected from the group consisting of:
(a) vinyl carboxylate esters,
(b) (meth)acrylates,
(c) olefinically unsaturated carboxylic acids,
(d) (meth)acrylic acid derivatives, and
(e) vinyl ethers, vinyl acetate, methyl acrylate, ethyl acrylate and butyl acrylate, wherein said polymerisation is carried out in the presence of units of one or more of polyunsaturated comonomers and/or by using a vinyl/double bond introducing chain transfer agent.

26. The process according to claim 1, wherein said pellet stream moves horizontally or essentially horizontally along said longitudinal axis from said inlet end of said first mixing section, which is defined to be in said horizontal line (0°), towards said outlet end of said mixing section, which is positioned between 0 to 45° above or below from said horizontal line.

27. The process according to claim 1, wherein said pellet stream moves horizontally or essentially horizontally along said longitudinal axis from said inlet end of said first mixing section, which is defined to be in said horizontal line (0°), towards said outlet end of said mixing section, which is positioned up to 20° above or below from said horizontal line.

28. The process according to claim 1, wherein said pellet stream moves horizontally or essentially horizontally along said longitudinal axis from said inlet end of said first mixing section, which is defined to be in said horizontal line (0°), towards said outlet end of said mixing section, which is positioned up to 15° above or below from said horizontal line.

29. The process according to claim 1, wherein said pellet stream moves horizontally or essentially horizontally along said longitudinal axis from said inlet end of said first mixing section, which is defined to be in said horizontal line (0°), towards said outlet end of said mixing section, which is positioned up to 10° above or below from said horizontal line.

30. The process according to claim 1, wherein at least one or more peroxide is applied as said at least one further components onto said fed polymer pellets.

31. A process for producing a crosslinkable cable comprising a conductor and at least one crosslinkable layer surrounding said conductor, wherein said process comprises:
producing a crosslinkable polymer composition for said at least one crosslinkable layer using polymer pellets; and
extruding said at least one crosslinkable layer on a conductor using the obtained polymer composition,
wherein said process has one or more polymer components and one or more further components, wherein in said process at least one of said one or more further components is incorporated into pellets by applying said at least one further components onto said pellets, said process comprising:
providing at least one first mixing apparatus comprising,
an inlet for feeding polymer pellets into said first mixing apparatus,
a first mixing section provided with a mixing device for moving and mixing a pellet stream along said section,
at least one application device for applying said at least one further components onto fed polymer pellets at one or more positions, whereby the at least one application device is arranged in the first mixing section to extend at least partly within the polymer pellet stream as such that said at least one application device is in direct contact with the polymer pellet stream, and
an outlet for removing the mixed pellet stream from said first mixing section;
feeding polymer pellets in said first mixing section arranged to cause the fed polymer pellets to flow and mix through one or more of the following movements, vibration and oscillation, wherein vibration or oscillation of the pellet stream is caused by one or more of a vibration causing apparatus or oscillation causing apparatus which is arranged outside the first mixing section in operational contact therewith, and the pellet stream moves horizontally or essentially horizontally in a non-gravimetrical flow along an elongated first mixing section from an inlet arranged at one end of said elongated mixing section towards an outlet arranged at the other end of said elongated mixing section, and no moving mixing device is present inside said first mixing section, wherein the degree of filling of the polymer pellets in said first mixing section is more than 20% of the volume of said first mixing section, wherein the first mixing section itself does not rotate 360° around the axis that is parallel to the flow direction of the pellet stream;
applying said at least one further components via said at least one application device onto the polymer pellets at a position selected from one or more of prior to said apparatus, at said inlet of said apparatus and/or within said first mixing section of said apparatus and recovering the obtained pellets in a conventional manner.

32. The process according to claim 31, for producing a crosslinkable cable, comprising said at least one crosslinkable layer and which is selected from the group consisting of a crosslinkable semiconductive layer, a crosslinkable insulation layer and a crosslinkable jacketing layer for producing a crosslinkable cable comprising an inner semiconductive layer, insulation layer and an outer semiconductive layer, in that order, wherein at least said insulation layer of said three layers is a crosslinkable layer.

33. The process according to claim 31, further comprising a step of crosslinking said at least one crosslinkable layer in crosslinking conditions at elevated temperature, using a peroxide, which is introduced to said layer material by applying as said at least one further components onto said fed polymer pellets.

* * * * *